United States Patent [19]

van Doorne, deceased

[11] 4,435,997

[45] Mar. 13, 1984

[54] AUTOMATIC CONTINUOUSLY VARIABLE TRANSMISSION

[75] Inventor: Hubertus J. van Doorne, deceased, late of Deurne, Netherlands, by Martinus P. J. H. van Doorne, executor

[73] Assignee: Erven Dr. Hubertus Josephus van Doorne, Eindhoven, Netherlands

[21] Appl. No.: 304,378

[22] Filed: Sep. 22, 1981

[30] Foreign Application Priority Data

Mar. 12, 1980 [NL] Netherlands .......................... 8001480

[51] Int. Cl.³ ............................................. F16H 15/50
[52] U.S. Cl. ....................................... 74/796; 74/191; 74/190.5
[58] Field of Search ...................... 74/796, 190, 190.5, 74/191

[56] References Cited

U.S. PATENT DOCUMENTS 2,029,042 1/1936 Turner .................................. 74/796
2,747,434 5/1956 Bade .................................... 74/796

FOREIGN PATENT DOCUMENTS 239649 1/1964 Netherlands ......................... 74/190

Primary Examiner—Leslie A. Braun
Assistant Examiner—D. Wright
Attorney, Agent, or Firm—Weingarten, Schurgin, Gagnebin & Hayes

[57] ABSTRACT

An automatic continuously variable transmission with a section controlling the transmission ratio between an input shaft and an output shaft. The controlling section comprises a central shaft carrying at least one radially extending shaft with a rotatable and slidable conical body with a concave-conical outer circumferential surface. Depending on the desired-torque-speed ratio, controlled by an axial thrusting force generated by a speed-dependent clutch, the body can cooperate with a spring-loaded annular body rotatable around the central shaft and having a convex-conical inner circumferential surface. The direction of rotation of the output shaft can be reversed by means of an adjustment mechanism.

10 Claims, 1 Drawing Figure

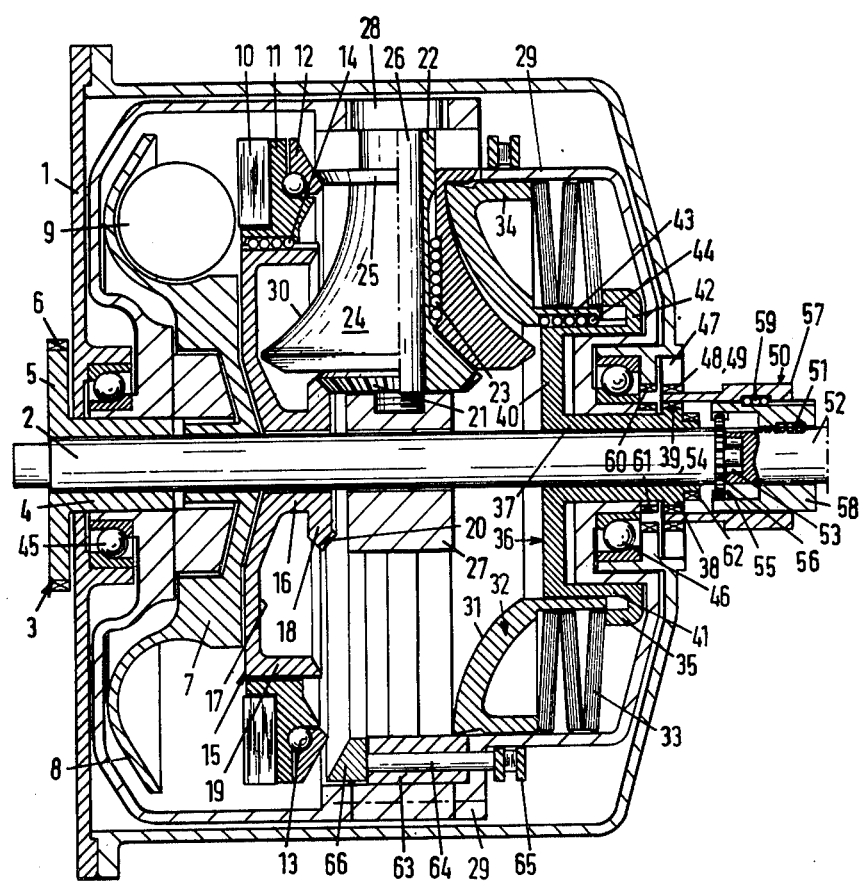

AUTOMATIC CONTINUOUSLY VARIABLE TRANSMISSION

This invention relates to an automatic, continuously variable transmission in a driving arrangement further comprising a motor and a shaft to be driven, the task of the automatic transmission being to steplessly adjust the torque supplied by the motor to the torque required at the driven shaft.

For this purpose the automatic, continuously variable transmission according to the invention comprises a speed-dependent clutch, a section cooperating with said clutch for steplessly controlling the transmission ratio between input shaft and output shaft, said section comprising a central shaft carrying at least one radially extending shaft with a conical body rotatable about the axis thereof, said conical body having an outer circumferential surface of concave curvature in axial direction, said conical body being longitudinally movable over said radial shaft, and being arranged to be driven for rotation about said shaft, said conical body being capable of cooperating, depending on the desired torque-speed ratio, via an axial pressure exerted by the speed-dependent clutch, with a spring-loaded annular body rotatable around the axis of said central shaft, said spring-loaded annular body having a conical inner circumferential surface of convex curvature in the axial direction, and further comprising an adjustment mechanism with which the direction of rotation of the output shaft relative to the input shaft can be determined.

The stepless transmission is realized by a cone movable on a radial shaft with different diameters cooperating with the conical inner circumferential surface of the annular body at different diameters thereof. In addition, by virtue of the features proposed in accordance with the present invention, there is provided an automatic, continuously variable transmission of a relatively short and compact construction, for which moreover the cross-sectional dimensions can be kept within the values which are normal for such transmission gears, owing to which the automatic transmission in its totally is relatively light in weight, and on account of its weight and dimensions can be incorporated in a vehicle normally provided with a hand-operated change gearbox.

The displacement of the cone is preferably effected by means of an axially thrusting, speed-dependent control mechanism derived from the speed-dependent clutch. All this can be effectively realized if the conical body is provided at its narrow end with a radial flange having a bevelled circumferential edge capable of cooperating with a corresponding bevelled end edge of an axially movable control ring mounted for rotation on an axially movable clutch plate of the speed-dependent clutch, said clutch plate being operated by centrifugal weights consisting of rollers housed in control cages that can be brought into rotation in a peripheral path around the central shaft by the input shaft. Owing to these features the conical body, and hence the transmission, will not be driven until after a pedetermined speed is exceeded, which renders the transmission extremely suitable for use in a motor vehicle.

Furthermore, the input shaft of the automatic transmission can be advantageously coupled direct to the output shaft, if the drum connected to the central shaft is provided with a bevelled edge corresponding to that of the control ring and located at a radial distance from the central shaft equal to that of the control ring, the arrangement being such that the control ring and the drum edge will come into contact with each other when the control ring has pushed the conical body into substantially its outermost position for directly coupling the input shaft and the output shaft with exclusion of the controlling section, whereby the parts affecting the transmission, which then have fulfilled their function, will stand still, which is favourable in connection with energy losses and wear and tear.

In order that the speed of the output shaft may be rapidly increased in case the input shaft and the output shaft are directly coupled, for example, for fast acceleration of a motor car incorporating the automatic transmission, there may be provided a so-called "kick-down", in that there are provided pins distributed over the circumferential edge of the drum, the axes of which pins are parallel to the central shaft, and which pins are mounted in the drum so as to be drivable for longitudinal movement, and are capable of displacing the control ring axially against the centrifugal coupling force.

Optimal utilisation of the available volume and optimal power transmission and force distribution are obtained if the central shaft carries three radial shafts uniformly distributed in its circumferential direction, and the forces exerted within the construction can be taken up in a simple but effective manner, if the radial shafts extend between the central shaft and a drum connected with the central shaft.

The requirement of the direction of rotation of the output shaft being reversible, which requirement is inherent in apparatus of the subject kind, can be realized in a simple manner in the automatic continuously variable transmission according to the present invention, owing to the fact that the adjusting mechanism for changing the driving direction is capable of operatively coupling either the conical bodies or the annular body with the output shaft, with the annular body being stationary or rotating around the central shaft, respectively.

If, in accordance with a further embodiment of the present invention, after starting and passing through the various transmission ratios, as a stationary operative position, a direct coupling can be realized between the input shaft and the output shaft, excluding the controlling part, power losses and wear and tear in the automatic transmission are minimized. One embodiment of the invention will now be described in more detail, by way of example, with reference to the accompanying drawing. The single figure of the drawing shows, diagrammatically, a longitudinal sectional view of an automatic, continuously variable transmission according to the present invention.

In the embodiment shown in the drawing, some details, which are essential for a good operation of the construction have been omitted as being unnecessary for clarifying the present invention. Among these are means for mounting and locking various parts, while further some parts are shown as one whole, which in practice will be assembled from a plurality of parts in order that these may be mounted. Furthermore, the suspension of the transmission box as a whole will be left out of consideration, and so will a number of—fixed—transmissions for, for example, speed adaptation of the automatic transmission to the motor connected to it.

Referring to the drawing, the embodiment shown comprises a housing 1, in which extends centrally a main or central shaft 2, on which a primary driving member 3 is mounted for rotation. This primary driving member comprises a sleeve 4, acting as an input shaft with a first radial end flange 5 provided with a ring gear 6 and a second end flange 7. Ring gear 6 can be driven, for example, by the flywheel of an interposed motor not shown. The outer circumferential part of end flange 7 is formed as a clutch housing, or control cage 8 mounting a plurality of centrifugal rollers 9, for example six, which upon rotation of the primary driving member are forced to move radially outwardly as a result of the centrifugal foce, with the clutch housing being so formed, however, that they move not only in a radial direction but also in an axial direction. During this displacement, rollers 9 will come into contact with a clutch plate 10 which, in a manner not shown, is so connected with the primary driving member that the plate can only move in an axial direction. When so moving, clutch plate 10 will come into contact with a thrust ring 11 carrying a control ring 12, which is rotatable relatively to thrust ring 11 about the central axis of the main shaft 2 by means of balls 13. Thrust ring 11 is supported so as to be restrained from rotation, but slidable in an axial direction by means of balls 14 running in guide tracks, by a secondary driving member 15 comprising a sleeve 16 with a radial flange 17 and a radial flange 18. Radial flange 17 terminates in an axial flange 19, which forms a supporting surface for thrust ring 11. Radial flange 18 is provided with a ring gear 20, which cooperates with a gear 21 forming part of a driving shaft 22. Mounted on this shaft, by means of a plurality of balls 23 accommodated in guide tracks, is a conical body 24, which in the vicinity of its apex is provided with a radial flange 25 with a circumferential edge shaped so as to be able to cooperate with control ring 12. Driving shaft 22 is hollow and mounted on an auxiliary, or radially extending shaft 26 mounted at one end in a hub 27 secured to the main shaft 2, and at the other end via an end piece 28 of larger diameter, in a drum 29.

Conical body 24 has a concave round circumferential surface 30 capable of cooperating with a similarly curved inner circumferential surface 31 of an annular body 32 urged into contact with the conical body by means of a plurality of dish springs 33 engaging at one end with an axial flange 34 of annular body 32, and at the outer end with an axial flange 35 of a hub member 36.

Hub member 36 comprises a sleeve 37, a radially extending end flange 38 terminating in a ring gear 39, a radial end flange 40 located opposite end flange 38 and terminating in an axial flange 41, which terminates in a radial flange 42, which in turn terminates into the axial flange 35 for supporting springs 33.

Annular body 32 has a second axial flange 43, which is provided with guide tracks for balls 44, which are further accommodated in guide tracks formed in the axial flange 41 of hub member 36, whereby annular body 32 is secured so as to be restrained from rotation, but axially movable relatively to hub member 36.

Drum 29 is mounted at one end on sleeve 4 and at the other end on hub section 36. Drum 29 is provided at both ends with axial flanges on which the inner ring of a ball bearing 45, 46, respectively is placed. The outer rings of ball bearings 45 and 46 are situated in hub portions of housing 1 at the two ends thereof. Housing 1 further mounts a freewheel clutch 47, that is to say a clutch permitting rotation in one direction only. Provided on the radial inside of clutch 47 is a ring gear 48, capable of cooperating with an external ring gear 49 on a slide member 50, which via balls 51 running in guide tracks is slidable on shaft 52 constituting the output shaft of the automatic transmission. A connection by means of a bearing 53 is provided between the main shaft 2 and the output shaft 52, so that the main shaft can rotate freely relatively to output shaft 52.

Slide member 50 is provided with two further, internal ring gears 54 and 55. Ring gear 54 is designed to cooperate with ring gear 39 of hub member 36. Ring gear 55 can cooperate with a gear 56 secured to main shaft 2 so as to be restrained from rotation relative to shaft 2. Slide member 50 is constituted by two concentric parts 57 and 58, which by means of balls 59 in guide tracks are secured so as to be rotatable but not slidable relatively to each other. Slide member 50 is mounted on shaft 52 to permit it to move in such a manner that ring gears 59, 54 and 55 can cooperate with ring gears 60, 61 and 62 or housing 1, drum 29 and hub member 36. Slide member 50 can be moved and arrested by means of an operating lever not shown.

Secured to drum 29 in the same cross-sectional area as that in which the end piece of auxiliary shaft 26 is located, is a support piece 63, in which a pin 64 is accommodated for sliding movement. One end of pin 64 is capable of cooperating with a thrust bearing 65, and the other end of pin 64 carries a segment 66 having a substantially radially directed circumferential surface of the same shape as the opposed surface of control ring 12.

Although, in the drawing, only one conical body is shown, it should be noted that it is preferable that there are three of such conical bodies, uniformly distributed in circumferential direction. Support pieces 63, pins 64 and segments 66 are then disposed in the intermediate area. For considerations of clarity, one conical body 24 is shown in the top part of the drawing, and one support piece 63 in the bottom part.

The operation of the above-described apparatus is as follows:

When the primary driving member 3 is driven, as a result of the centrifugal forces generated, rollers 9 will come into contact with clutch plates 10 and push these into contact with thrust ring 11. As a result the latter will start rotating, thereby carrying along the secondary driving member 15. Via ring gear 20, gear 21 and conical body 24, which is connected to it so that it cannot rotate relative to it, will be set in rotation. Conical body 24 will in turn try to rotate annular body 32. By means of dish springs 33, however, annular body 32 is spring loaded into a non-rotary connection with the hub member 36, which via its ring gear 39 and ring gears 54 and 49 of slide member part 57, as well as ring gear 48 is connected to the freewheel clutch 47, which prevents rotation of hub member 36. Annular body 32 will accordingly remain stationary, the result of which is that conical body 24 will start rolling on annular body 32, as a result of which the entire drum and the main shaft 2 are rotated, with the direction of rotation being the same as that of the driving motor. The main shaft 2, via gear 56, mounted on it, and ring gear 55, will rotate sliding member part 58 and hence the output shaft 52.

If now the input rpm of the primary driving member is increased, the centrifugal rollers 9 will move clutch plate 10 and thrust ring 11 axially towards conical body 24. Control ring 12, which thereby is also moved, will accordingly push conical body 24 radially outwardly.

Owing to the radial displacement of conical body 24, annular body 32 is given an axial displacement, as a consequence of which the diameters over which the two bodies 24 and 32 are in interengagement are varied, and so is, accordingly, the transmission ratio. This process is continued when the input speed of the primary driving member 3 is further increased, until a transmission ratio of substantially 1 to 1 is reached. Conical body 24 is then in its radially outermost position, with control ring 12 making contact with segments 66, whereby a direct connection between input shaft and output shaft is obtained.

In this position conical body 24 will gradually be stopped, and the entire drum 29 with the parts contained therein will rotate at the same rpm value as the motor, with transmission losses being incurred by ball bearings 45 and 46 only.

In case fast acceleration is required, it is preferable that the above direct connection between input shaft and output shaft, i.e. the 1-to-1 transmission ratio, is broken. In the present construction this can be realized by pushing pins 64 and segments 66 connected with them via the thrust bearing 65 into the direction of the primary driving member. The axial displacement of the control ring 12, which is thereby brought about, will result in conical body 24 being displaced radially inwardly as a result of the axial pressure from dish springs 33, so that a decrease of the transmission ratio, and hence an increase of the rpm value of the output shaft 52 are accomplished.

The drawing shows the apparatus in the position in which the direction of rotation of output shaft 52 is equal to that of the driving motor. If the direction of rotation of output shaft 52 should be opposite to that of the driving motor, slide member 50 must be shifted on shaft 52 until ring gears 49, 54 and 55 start cooperating with ring gears 60, 61 and 62, respectively.

When the primary driving member 3 is driven, in the first instance the same will take place as described above, but with the difference that now annular member 32 is no longer blocked from rotation, whereas drum 29 is, the latter now being coupled with housing 1 by means of ring gears 61, 54, 49 and 60. Annular body 32 will accordingly start rotating, thereby carrying along hub member 36. Via ring gears 62 and 55, hub member 36 is coupled to slide member part 58, and hence with the output shaft 52, which now has a direction of rotation opposite to that of the driving motor.

As, here again, the various transmission ratios can be traversed fully continuously, output shaft 52 can be driven through a large control range in both directions.

I claim:

1. An automatic, continuously variable transmission comprising a speed-dependent clutch, a section cooperating with said clutch for steplessly controlling the transmission ratio between an input shaft and an output shaft, said section comprising a central shaft having a first longitudinal axis carrying at least one radially extending shaft with a conical body having a second longitudinal axis transverse to said first longitudinal axis rotatable about said second longitudinal axis thereof, said conical body having an outer circumferential surface of concave curvature in the direction of said second longitudinal axis said conical body being longitudinally movable over said radial shaft, and being arranged to be driven for rotation about said shaft, a spring-loaded annular body cooperating with said conical body, depending on the desired torque-speed ratio, via an axial pressure exerted by the speed dependent clutch, along a direction substantially parallel to said first longitudinal axis, with said spring-loaded annular body further having a conical inner circumferential surface of convex curvature in the axial direction of said second longitudinal axis, and means for reversing the direction of rotation of the output shaft relative to the input shaft.

2. An automatic transmission as claimed in claim 1, characterized in that the conical body is provided at its narrow end with a radial flange having a bevelled circumferential edge capable of cooperating with a corresponding bevelled end edge of an axially movable control ring.

3. An automatic transmission as claimed in claim 2, wherein the control ring is mounted for rotation on a clutch plate of the speed-dependent clutch, said clutch plate being operated by centrifugal weights.

4. An automatic transmission as claimed in claim 3, wherein said centrifugal weights consist of rollers housed in control cages that can be brought into rotation in a peripheral path around the central shaft by the input shaft.

5. An automatic transmission as claimed in claim 1, characterized in that a drum connected to the central shaft is provided with a bevelled edge corresponding to that of the control ring and located at a radial distance from the central shaft equal to that of the control ring, the arrangement being such that the control ring and the drum edge will come into contact with each other when the control ring has pushed the conical body into substantially its outermost position for directly coupling the input shaft and the output shaft with exclusion of the controlling section.

6. A transmission as claimed in claim 5, characterized in that there are provided pins distributed over a circumferential edge of the drum, said pins having axes which are parallel to the central shaft, and which pins are mounted in the drum so as to be drivable for longitudinal movement, and are capable of displacing the control ring axially against a centrifugal coupling force.

7. A transmission as claimed in claim 1, characterized in that the central shaft carries three radial shafts uniformly distributed in its circumferential direction, and each having a conical body.

8. An automatic transmission as claimed in claim 1, wherein the radial shafts extend between the central shaft and a drum connected with the central shaft.

9. A transmission as claimed in claim 1, characterized in that the means for reversing is capable of operatively coupling either the conical body or the annular body with the output shaft, with the annular body being stationary or rotating around the central shaft, respectively.

10. A transmission as claimed in claim 1, characterized in that after starting and passing through the various transmission ratios, as a stationary operative position, a direct coupling is realized between the input shaft and the output shaft, by bypassing the controlling part.

* * * * *